June 17, 1930.　　　A. R. TEARE　　　1,764,703
HEATING AND VENTILATING APPARATUS
Filed March 5, 1928　　　3 Sheets-Sheet 2

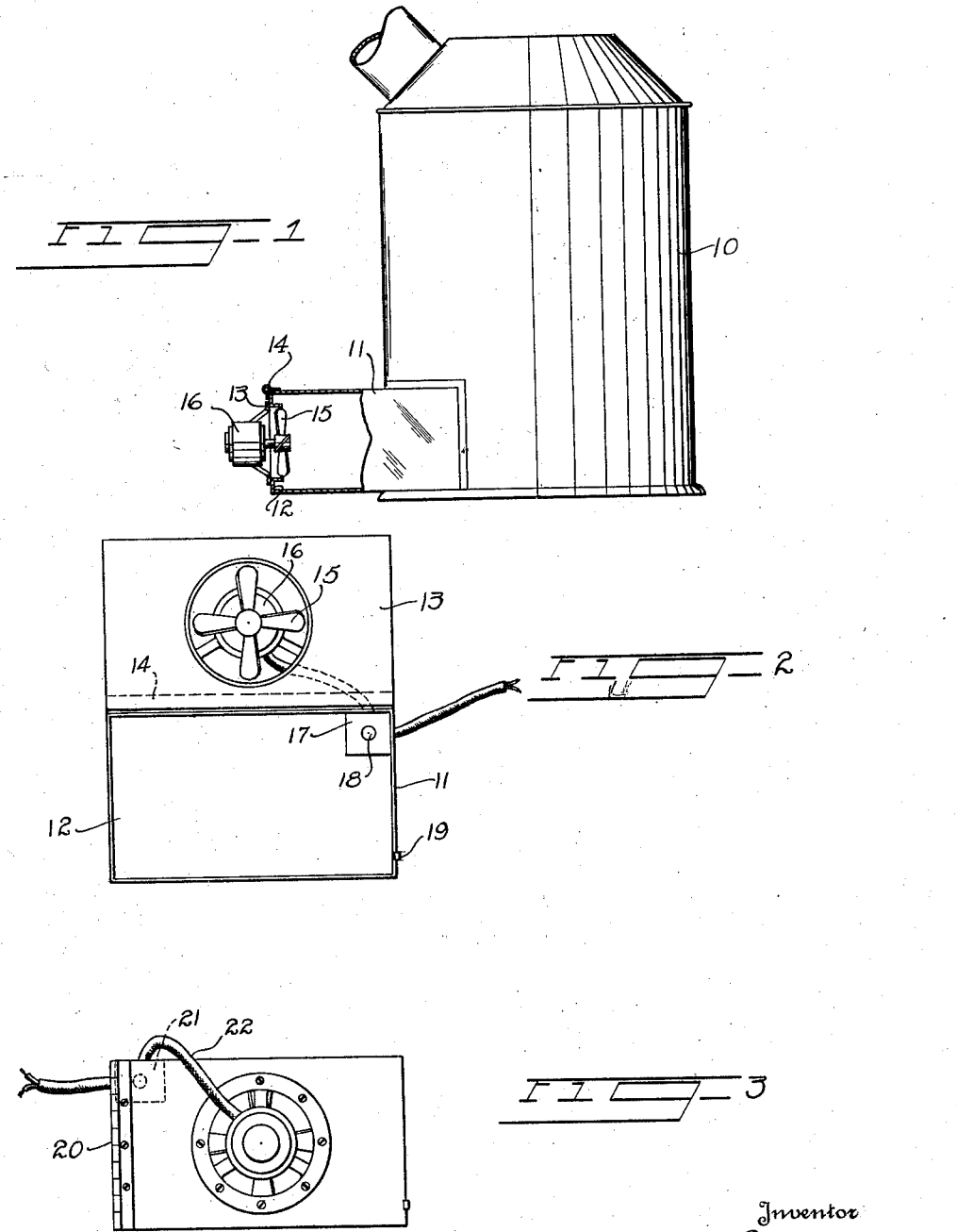

Inventor
Albert R. Teare
By Bates Macklin Gobrick & Teare
Attorneys

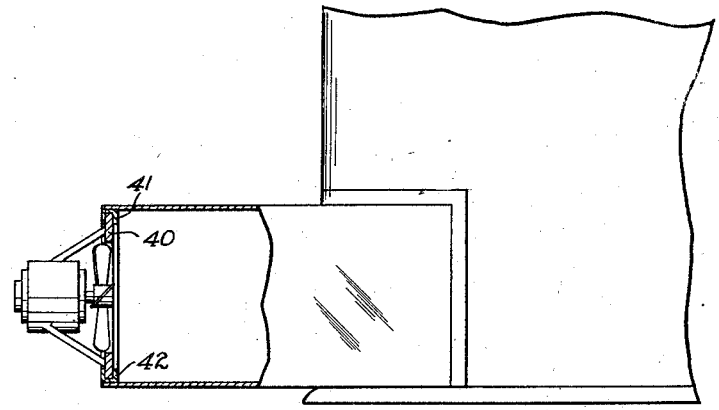
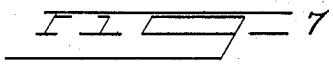
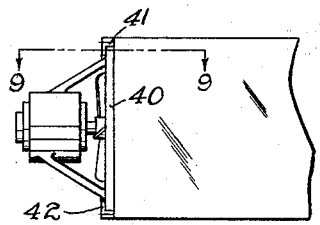
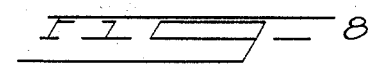
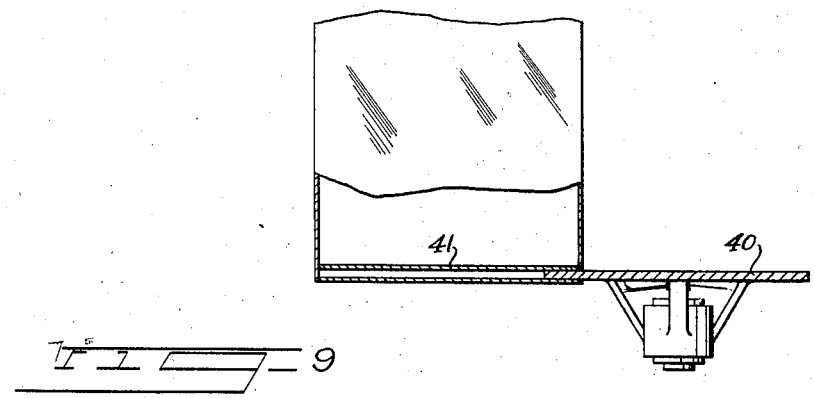

Patented June 17, 1930

1,764,703

UNITED STATES PATENT OFFICE

ALBERT R. TEARE, OF LAKEWOOD, OHIO, ASSIGNOR TO JAMES C. MILES, OF CLEVELAND, OHIO

HEATING AND VENTILATING APPARATUS

Application filed March 5, 1928. Serial No. 259,112.

This invention relates to heating and ventilating apparatus, particularly that which is intended for use in connection with the operation of a hot air heating furnace. In order to insure positive and uniform distribution of air from the furnace through the various delivery pipes and into the rooms to be heated, it is advantageous to utilize a fan which is placed at or near the inlet to the heating chamber of the furnace and to operate the fan at certain intervals. Ordinarily a certain area of inlet opening is required to maintain an adequate volume of air through the heating chamber under the gravity system. Accordingly, if a fan is placed in the opening, provision must be made for allowing all of the air entering the chamber to be forced thereinto through the fan opening when the fan is in operation, and provision must also be made for providing adequate opening area when the fan is stopped, so as to prevent the furnace from being burned out.

The principal object of the present invention is to provide an apparatus which is adapted to be used in connection with the operation of a hot air heating furnace to change the furnace from a gravity system to a forced air system. An additional object is a construct an apparatus which may be readily installed on existing furnaces and which may be quickly and easily actuated to effect the change from one system to the other.

My invention also contemplates an apparatus which when not in operation allows the full unrestricted area of the inlet passageway to be utilized for the operation of the gravity system, thus avoiding the burning out of the furnace. Moreover, the arrangement is such that all of the air flowing into the furnace must flow through the fan opening thus enabling the volume to be definitely controlled.

The invention set forth herein is not only adapted for use in connection with hot air heating furnaces which have an air inlet passageway opening into the furnace room, but is also arranged to be used in connection with furnaces wherein the inlet passageway constitutes a riser through which air enters the furnace from the rooms which are heated.

Figure 4:
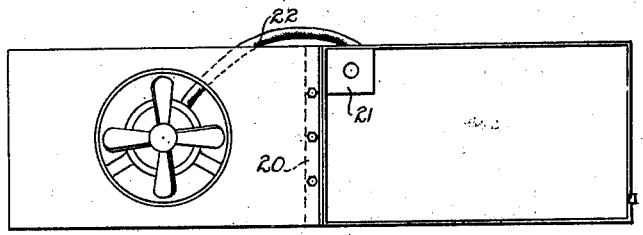
Figure 5:
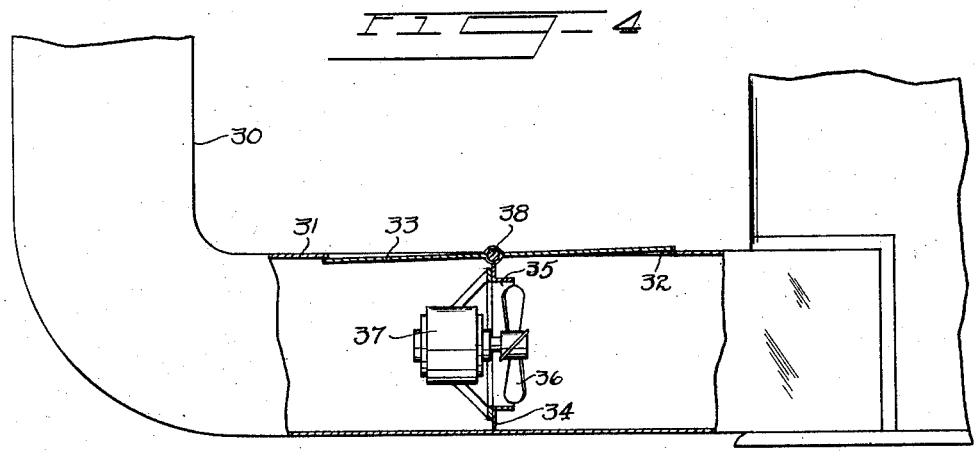
Figure 6:
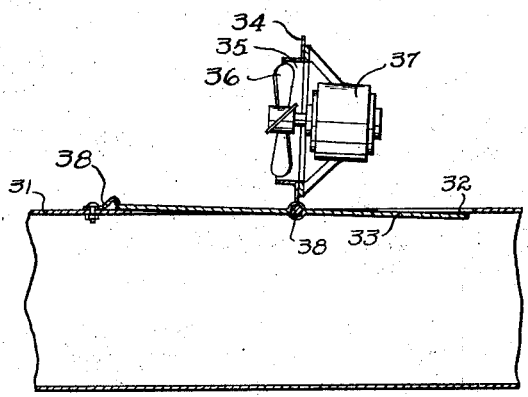

Referring to the drawings, Fig. 1 is a side elevation partly in section of a hot air heating furnace having a form of my invention associated with the air inlet passageway leading to the heating chamber, and showing the fan in an operative position; Fig. 2 is an enlarged end elevation of the inlet passageway showing the fan in an inoperative position; Fig. 3 is an end elevation of an air inlet passageway showing a modified form of mounting for the fan; Fig. 4 is a similar end elevation illustrating the fan of Fig. 3 in an inoperative position; Figs. 5 and 6 are views indicating two positions respectively of a fan which is used in connection with a heating system embodying a riser through which air may enter the heating chamber; Fig. 7 is a view partly in section showing another modification of the motor mounting; Fig. 8 is a side elevation of the apparatus shown in Fig. 7; and Fig. 9 is a horizontal section taken through the apparatus on a plane indicated by the line 9—9.

Referring now to Fig. 1, 10 indicates a heating chamber of a hot air furnace having an inlet passageway 11, the opening 12 of which leads into the furnace room. The cross sectional area of this passageway is such that sufficient air may enter the heating chamber to provide satisfactory operation under the gravity system.

To change the system from a gravity to a forced air type, I have shown a closure member 13 in the form of a plate which is hinged at 14 to the top wall of the passageway 11. Such member has an opening 14 in which a fan 15 is arranged to operate. An electric motor 16 preferably carried by the member is utilized for actuating the fan. Thus, the fan, motor and plate may be swung as a unit about the passageway to an inoperative position as shown in Fig. 2, or may be swung downwardly to an operative position as shown in Fig. 1.

To avoid stopping of the motor without providing for adequate flow of air into the heating chamber under the gravity system, I have indicated, particularly in Fig. 2, a push button switch 17 which is mounted in the passageway 11 and is connected in the motor circuit. The switch is so positioned that the member 13 strikes the push button 18 when the plate is lowered to the position shown in Fig. 1. When the push button is so actuated, the switch is closed, thus starting the motor. Conversely the push button is returned to open position under the action of a spring, as is usual in this form of switch when the plate is raised to the position shown in Fig. 2. For the purpose of my invention, any standard form of push button switch is satisfactory.

In some installations the weight of the motor is sufficient to hold the plate in the position shown in Fig. 1 against the pressure of air which would be built up within the heating chamber. In other installations, this may not be sufficient, but a simple form of spring latch may be utilized in such cases for holding the plate in proper position with reference to the passageway. One form of such latch is shown at 19 in Fig. 2.

Where space limitations prohibit the hinging of the unit to the top of the passageway, provision may be made for hinging it to a side wall of the passageway, as indicated at 20 in Fig. 3, where the unit is shown in closed, or operative position. In Fig. 4 the same unit is illustrated in open, or inoperative position. In each of these illustrations the switch box 21 is shown as being mounted upon the passageway, while a flexible electrical conduit 22 leads therefrom to the motor.

In Fig. 5 I have shown my invention as applied to the operation of a furnace wherein the inlet air is led through a riser from one or more of the heated rooms. Such riser is indicated at 30, while the connecting passageway 31 extends from the riser to the heating chamber of a furnace. The top wall of the passageway 31 has an opening 32 across the approximate mid-portion of which, a closure plate 33 is pivotally mounted, as at 38. This opening extends substantially across the top wall of the passageway.

Depending from the closure member 33 and adjacent the point of pivotal connection, I have shown a plate 34 which has an opening 35 in which a fan 36 is positioned. An electric motor 37 is utilized for actuating the fan. Such motor is indicated as being mounted upon the member 34.

In Fig. 5 the position of the parts is such that the motor is in operative position and is being utilized for forcing air into the heating chamber. During such operation the opening of the top wall of the passageway is closed by the member 33. In Fig. 6 the motor is in the inoperative position while the opening 32 is still closed by the member 33. Such change is made merely by swinging the member about its supporting pivot, as will be readily understood from an inspection of the drawings. A latch 38 can be utilized for holding the closure member in the position shown in Fig. 6.

In Figs. 7, 8 and 9 I have shown another modified form of mounting wherein the motor is carried by a plate 40 which is slidably mounted in guides 41 and 42 adjacent the top and bottom walls respectively of the inlet passageway. In Fig. 7 the plate is in closed or operative position, while in Figs. 8 and 9 it is shown in open, or inoperative position. In the closed position all of the air entering the heating chamber must flow through the fan opening, while in open position, the inlet to the passageway is unobstructed. If desired, a switch box similar to that illustrated in the other forms of the invention may be utilized for automatically closing the motor circuit when the plate is moved to closed position, and automatically opening the circuit when the plate is moved to open position.

An important advantage of my invention is the fact that under the forced air system all of the air entering the chamber is positively caused to flow only through the fan opening, and that under the gravity system, the inlet opening to the air passageway is unobstructed. A further advantage of my invention is that the motor, fan and plate comprise a simple compact unit which may be readily installed in existing hot air furnaces.

I claim:

1. The combination with the heating chamber of a hot air furnace having an air inlet leading thereto, said conduit having a plurality of enclosing walls, one of the walls having an opening therein, a closure member pivotally mounted on the conduit adjacent the mid-portion of the opening and adapted to be swung in an arc of substantially 180°, said member having an apertured depending portion projecting into the conduit, a motor driven fan mounted on said portion with the fan adjacent said aperture, said fan and damper being arranged to be swung upwardly through the wall opening when the fan is not in operation.

2. In combination, a heating chamber of a hot air furnace having an air inlet conduit leading thereto, an apertured closure member hinged to the conduit and adapted to occupy alternative positions within and outside of the conduit when moved about the hinged connection, means for automatically starting the motor when the member is moved into one position and for automatically stopping the motor when the member is moved to the other position.

3. In combination, a heating chamber of a hot air furnace having an air inlet conduit leading thereto, an apertured closure member hinged to the conduit and adapted to occupy alternative positions within and outside of the conduit when moved about the hinged connection, and means for automatically starting the motor when the member is moved into one position.

4. In combination, an air conduit having a plurality of enclosing walls, one of the walls having an opening therein leading to the atmosphere, a closure member comprising a plate pivotally mounted on the conduit adjacent said opening, said member having a portion thereof projecting into the conduit, a motor driven fan mounted on said portion, said member being adapted to be swung about the pivotal connection, whereby the fan and motor occupy alternative positions within and outside of the conduit, and whereby the member in either position maintains the opening closed.

In testimony whereof, I hereunto affix my signature.

ALBERT R. TEARE.